Dec. 22, 1931.  E. STAUDER  1,837,344
METHOD OF MAKING CIRCULAR SAWS
Filed July 8, 1930   2 Sheets-Sheet 1
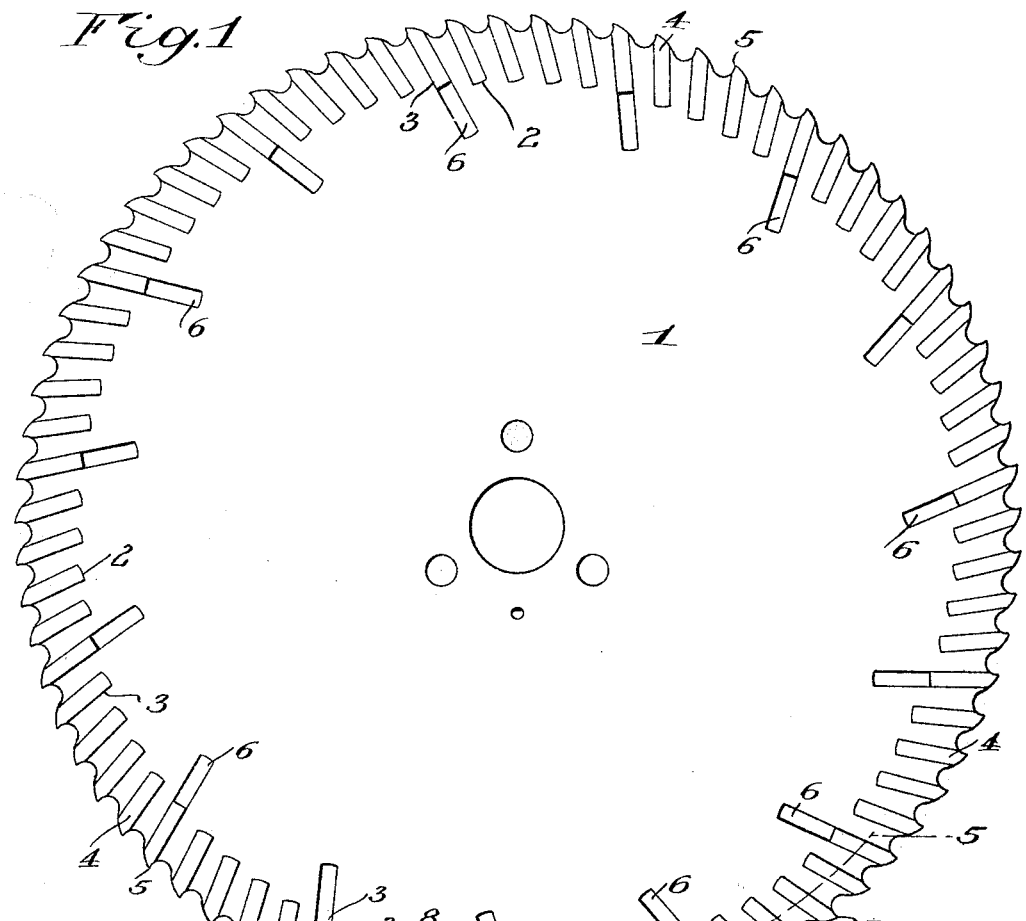
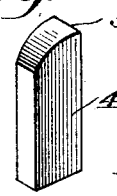
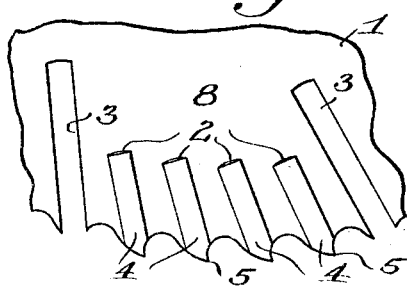
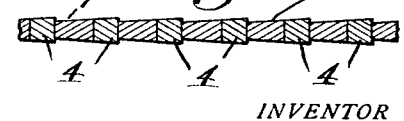
INVENTOR
Emanuel Stauder
BY
his ATTORNEY

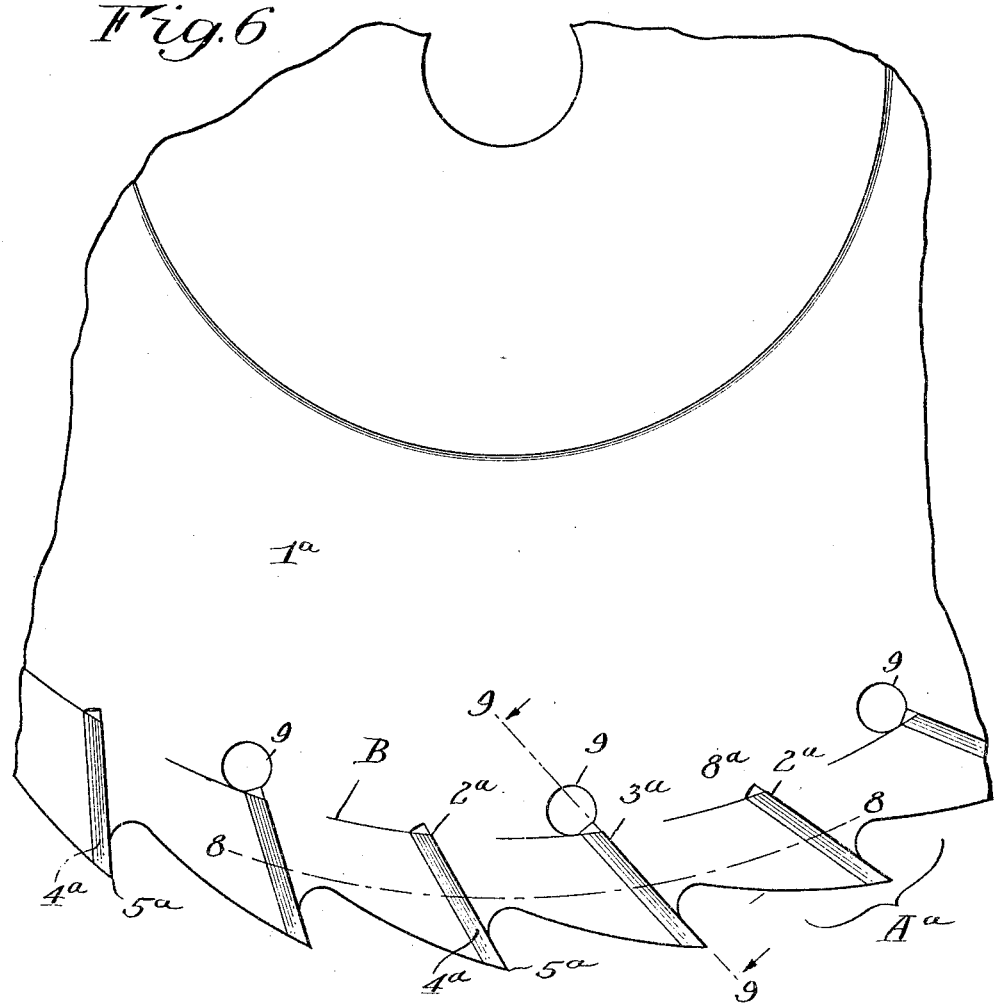
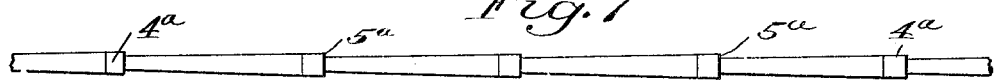
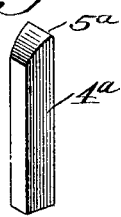
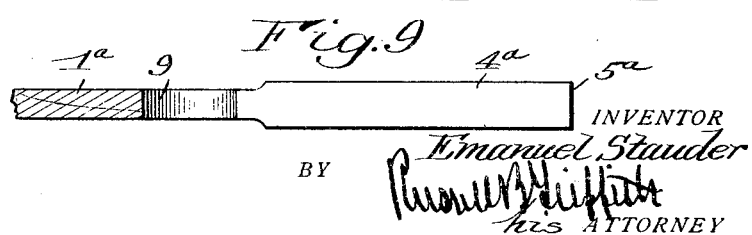

Patented Dec. 22, 1931

1,837,344

UNITED STATES PATENT OFFICE

EMANUEL STAUDER, OF ROCHESTER, NEW YORK, ASSIGNOR TO HUTHER BROS. SAW MFG. CO., INC., OF ROCHESTER, NEW YORK, A CORPORATION OF NEW YORK

METHOD OF MAKING CIRCULAR SAWS

Application filed July 8, 1930. Serial No. 466,450.

Circular saws for cutting both wood and metal have long been made with what is known as "inserted" teeth, that is, the body of the saw blade is provided on its periphery with means for receiving and holding cutting edges separately formed. The purpose of this is to permit the use of a relatively cheap and tough steel or other metal for the center or body and a harder and more lasting metal for the teeth carrying the cutting edges, which teeth are made of more expensive material. Various means have been employed for holding the inserts in place. Sockets of irregular cross section are usually employed with a locking pin or element of some kind driven through at the joint line to interlock the tooth element and the body element. Such a three-part structure is objectionable for several reasons. The fit of the tooth element in its socket must be accurate and the fit of the locking plate must be accurate, or these parts will work loose under the tremendous strain of cutting contact, rendering the saw worthless until repaired. The side facing or grinding of the saw blade necessarily weakens the fitting of the parts, as does the grinding incident to backing off the teeth, and further, as soon as the saw, through continued use, has been ground down with repeated sharpenings to the region of the locking plug or pin, its usefulness is at an end.

My present invention has for its object to provide a method of saw construction applicable to both metal and wood cutting saws that will cure the above named objections, at the same time producing an integral structure that will permit the use of a relatively harder material for the cutting edges of the teeth and the replacement of individual teeth in the completed saw, all without danger of fracturing or distorting the saw body or blade, while at the same time using the process of brazing to incorporate the hardened teeth in the saw structure.

To these and other ends, the invention resides in certain improvements and combinations of parts, all as will be hereinafter more fully described, the novel features being pointed out in the claims at the end of the specification.

In the drawings:

Fig. 1 is a side or face view of a circular metal cutting saw constructed in accordance with and illustrating one embodiment of my invention;

Fig. 2 is an enlarged fragmentary section of a group of the peripheral teeth illustrative of the method of assembling them;

Fig. 3 is a detailed perspective view of one of the teeth;

Fig. 4 is a fragmentary edge view of the saw;

Fig. 5 is a fragmentary section taken on the line 5—5 of Fig. 1;

Fig. 6 is a fragmentary side or face view of a wood cutting saw constructed in accordance with my invention and illustrating another embodiment thereof;

Fig. 7 is a fragmentary edge view thereof;

Fig. 8 is a fragmentary section on the line 8—8 of Fig. 6;

Fig. 9 is an enlarged fragmentary section on the line 9—9 of Fig. 6, and

Fig. 10 is a detailed perspective view of one of the teeth shown in Fig. 6.

Similar reference numerals throughout the several views indicate the same parts.

Referring more particularly to the drawings, and first to Figs. 1 to 5 thereof, 1 indicates the body or central saw disk, having the usual spindle attaching fixtures at the center and which is preferably made of a tough untempered or slightly tempered steel. In the practice of my invention, I provide the periphery of the disk at equal intervals with slots 2 and 3, which are preferably inclined from the radii in the direction of rotation. The slots 3 are interspersed with the slots 2 and are considerably deeper, as shown, so that a group A of shallow slots intervenes between each pair of deep slots. In the present instance, every fifth slot is a deep one. These slots are not of special shape but may be, and preferably are, rectangular in cross sectional area, such as would be produced by an ordinary milling machine cutter.

The inserted teeth 4 are of special extremely hard tempered steel or alloy, such as are known in the art to maintain a sharp and lasting cutting edge 5. They may be prepared of a shape rectangular in cross section, at least two opposite faces being flat and parallel to snugly fit between the corresponding faces of the slots. Those in the groups A completely fill the slots 2. Those in the slots 3 may be of the same length, so that they occupy only the outer portions of the slots, leaving permanent openings 6. The teeth are first driven with a close fit into the slots or sockets and then brazed in position, which makes a substantially integral piece of both the body 1 and the teeth 4.

No attempt has been made to show the brazing in the drawings as its general mechanical effect is well known. After all the teeth have been brazed in place, the center portion of the body of the saw is side ground, as seen in Fig. 9, to a perfect plane as to its center portion up to a pitch line defined by the butts of the teeth and the teeth backed off to provide the cutting edges 5 in the usual manner in which a one-piece saw of this character is usually finished and ground, resulting in the same rigidity and secureness of the teeth. A clearance 7, best shown in Fig. 5, is also provided at the sides of the teeth by grinding away the body between successive teeth.

In the process of brazing, I follow a particular method to prevent distortion or cracking of the body disk 1 due to expansion and contraction of the metal locally in the peripheral regions of the body disk 1 under brazing temperatures, which, as will appear, is the reason for the provision of the deep slots 3. To these ends, I insert and braze each group of teeth A in the shorter slots first, one after another, throughout the circumference of the saw. The longer slots 3, between which each of said groups is comprised, produce what may be termed a projecting fragment 8 of the saw, the expansion and contraction of which does not affect other portions of the saw body, individual freedom being given this whole portion 8 in this respect by the presence of the empty slots 3. The teeth are then inserted and brazed individually and successively in the slots 3, but the heat required for this individual brazing is of less intensity and does not produce the strain that would result from brazing all the teeth at once or any considerable number of them not relieved by such a segregation as is provided by the long slots or sockets 3.

The wood cutting saw of Figs. 6 to 10 is constructed in substantially the same way and by the same method, so that the same reference numerals are applied thereto with the exponent "a" attached, but with this exception: The slots 2$^a$ and 3$^a$, as such, are milled to the same depth, but the expandible area 8$^a$ is produced by drilling holes 9 at the bases of the slots 3$^a$ tangent thereto and forming continuations thereof. In some respects, this is preferable to the formation of Fig. 1 in that no sharp corner edges are presented from which a crack, due to expansion or contraction, would naturally start.

In both embodiments, it will be observed that, while still maintaining the secureness and integrality of the teeth, the saw may be ground down in each instance until the material of the teeth has been entirely consumed through repeated sharpenings, which is true of no other saw construction of this general nature of which I am aware. The minimum diameter at which the saw may be said to be worn out is indicated by the dash line B.

The openings 6 and 9 are of enduring utility as a structural feature of the completed saw. In the event that any of the hardened inserted teeth become broken, they can be individually removed by localized applications of heat, which would otherwise tend to crack the saw. With the flexibility and the opportunity for expansion under heat provided by the openings, this is not so apt to occur.

I claim as my invention:

1. A method of making circular saws which embodies preparing a disk to constitute the saw body, slotting the same radially around its periphery, certain of the slots at intervals being cut deeper than the intervening slots, fitting cutting elements in the said intervening slots to project therefrom, brazing each such group of cutting elements in place successively and fitting and brazing cutting elementes in the longer slots between such groups to produce an integral structure.

2. A method of making circular saws which embodies preparing a disk to constitute the saw body, slotting the same radially around its periphery, certain of the slots at intervals being cut deeper than the intervening slots, fitting the cutting elements in the said intervening slots to project therefrom, brazing each such groups of cutting elements in place successively, fitting and brazing cutting elements in the longer slots between such groups to produce an integral structure, and grinding down the edges of the disk between the cutting elements to back off the cutting elements at the sides.

EMANUEL STAUDER.